Sept. 2, 1952    J. E. McBRIDE ET AL    2,609,086
CATERPILLAR DRIVE CHAIN

Filed May 26, 1949    4 Sheets-Sheet 1

INVENTOR.
JESSE E. McBRIDE
WALTER G. BOEHM
BY
Farley Forster Farley
ATTORNEYS

Sept. 2, 1952     J. E. McBRIDE ET AL     2,609,086
CATERPILLAR DRIVE CHAIN

Filed May 26, 1949     4 Sheets-Sheet 2

INVENTORS
JESSE E. McBRIDE
WALTER G. BOEHM
BY
Farley, Forster & Farley
ATTORNEYS Sept. 2, 1952

J. E. McBRIDE ET AL 2,609,086

CATERPILLAR DRIVE CHAIN

Filed May 26, 1949

INVENTOR.
JESSE E. McBRIDE
WALTER G. BOEHM
BY
Farley, Forster & Farley
ATTORNEYS

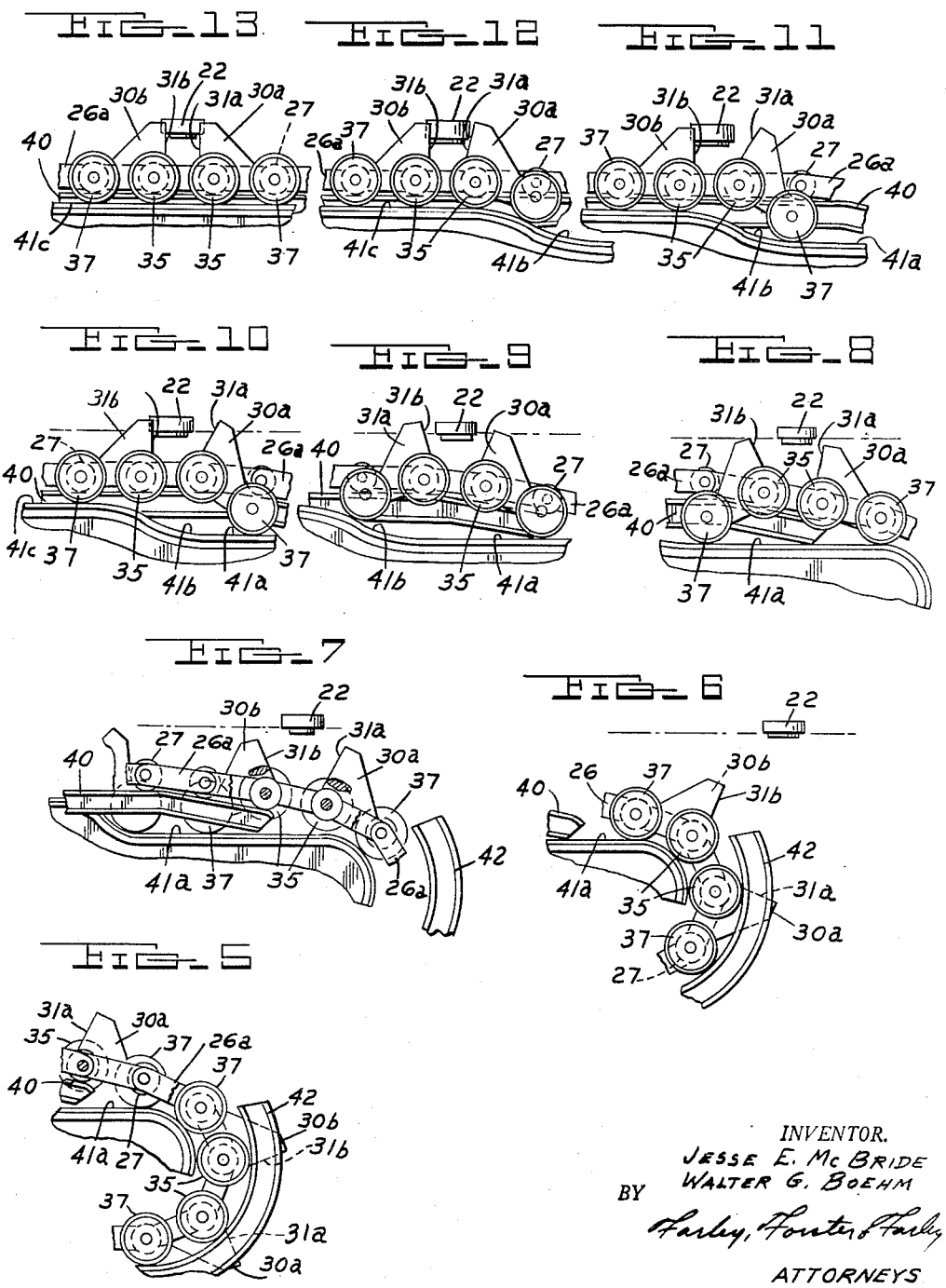

UNITED STATES PATENT OFFICE 2,609,086

CATERPILLAR DRIVE CHAIN

Jesse E. McBride, Highland Park, and Walter G. Boehm, Detroit, Mich., assignors to Palmer-Bee Company, Detroit, Mich., a corporation of Michigan Application May 26, 1949, Serial No. 95,534

10 Claims. (Cl. 198—203)

This invention relates to endless chain drives for conveyor chains and has for its principal object to provide a reversible drive without lost motion between the drive chain and conveyor chain.

In United States Patent No. 1,884,112 a conveyor system is disclosed wherein load supporting trucks are adapted to be propelled around horizontal turns having relatively short radii. Such system employs a conveyor chain having side bars pivotally connected by vertical connecting pins on the intermediate portion of which rollers are journaled. The perimeter of these rollers projects beyond the edges of the side bars in a manner permitting the rollers to contact a guide rail in passing around a horizontal turn. Such patent further discloses trucks comprising a load supporting platform resting without rigid connection on a pair of axles, the platform being rigidly connected to one of the upper side bars of the conveyor chain, while the axles are rigidly connected to adjacent side bars fore and aft of such platform. Wheels independently journaled on each axle on either side of the conveyor chain are adapted to run on side tracks so that in rounding a horizontal curve, the individual links of the conveyor chain, together with the platform and axles rigidly associated respectively with such links are free to move independently about the same radial center.

This general conveyor arrangement, because of its adaptability to sharp turns with little frictional resistance, has found successful application in various commercial foundry and steel mill operations. For example, in one case the conveyor has been used in connection with the cooling of coils of sheet metal, such coils being loaded on to the trucks at one point, conveyed to one end of a cooling area, doubling back around a sharp turn, and being unloaded at another point.

Automatic loading and unloading equipment for such conveyor presented requirements for starting and stopping the conveyor at given intervals, synchronized in time with the winding of the rolls of sheet metal. Since accurate alignment of the trucks with the loading and unloading equipment was required each time the conveyor stopped, a serious problem in controlling the accurate stopping of the conveyor line arose. The conventional endless chain drives employed with a conveyor of this type incorporate drive dogs for propelling only and, since the tremendous loads involved were carried on anti-friction bearings, the drift resulting from inertia of the load carried the conveyor line past the point where the drive chain stopped. Such drift occurred notwithstanding accurate motor controls for slowing the conveyor drive down to a very gradual movement for the last portion of each drive cycle. In practice, the uniformity of such drift could not be relied upon to meet the accuracy requirements of alignment between the trucks and loading equipment, and misloading could occur, threatening the stoppage of conveyor and rolling mill operations.

The present invention is directed to provide a positive control for stopping a conveyor line of this type within the high accuracy requirements of an operation such as that described above. Since the endless drive chains with their sprocket drives could be stopped with accuracy with magnetic motor brakes or otherwise, the problem was reduced to providing braking as well as propelling engagement between the drive chain and the conveyor chain and to substantially eliminate any lost motion between such engagements upon reversing drive.

Accordingly, the principal object of the present invention is to provide a propelling and retarding drive between a conveyor chain of the type described and an endless drive chain capable of controlling the stopping as well as the propelling of such conveyor chain.

Another object is to provide a two-way drive between such conveyor and drive chains which will involve substantially no lost motion in reversing the direction of drive.

Another object is to provide two-way drive engagement with the rollers of a conveyor chain of the type described above.

Another object is to provide a substantially normal engagement between driving and driven members in a manner such as will avoid any scuffing in such engagement.

Another object is to provide cooperating dogs on an endless drive chain which are adapted to move together in a manner of closing jaws to drivingly engage the rollers of the conveyor chain, confining such rollers against movement in either direction relative to the drive chain.

Another object is to provide drive dogs which are partially positioned by the drive chain itself and partially by guide tracks at variance with the path of such chain.

Another object is to provide drive dogs pivotally connected along one axis to the drive chain, and having another portion free to follow a path at variance with that of the drive chain, which may be employed to control the inclination of the drive engaging face of such dog.

Another object is to provide opposing dogs of identical construction, the engaging faces of which may be similarly controlled to provide a closing jaw action.

These and other objects will become apparent from the following detailed description of a particular embodiment of our invention and from an examination of the drawings forming a part hereof, wherein Fig. 1 is a side elevation of an endless drive chain embodying our invention;

Fig. 3 is a plan view of a section of the endless drive chain showing a pair of drive dogs;

Fig. 4 is a sectional view of a drive dog taken along the line 4—4 of Fig. 3;

Figs. 5 through 13 are progressive fragmentary views of a pair of drive dogs moving into driving engagement with a roller of the conveyor chain; and Fig. 14 is an end elevation taken along the line 14—14 of Fig. 1.

Figure 1:
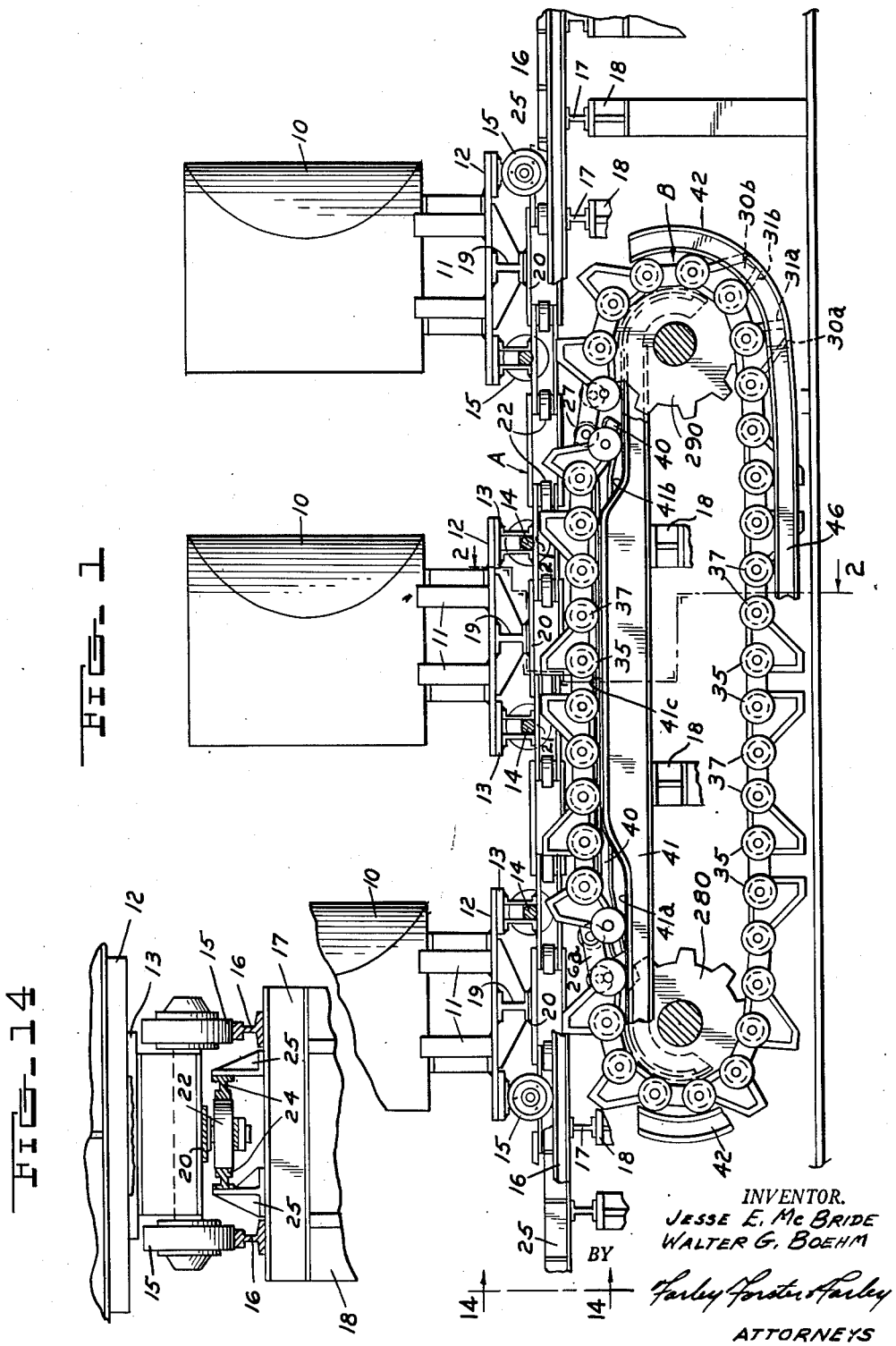

Referring to Fig. 1, it will be seen that conveyor loads 10 which in the present instance are coils of sheet steel are each supported on a pair of cross beams 11 mounted on a horizontal pallet 12 which in turn rests at either end on horizontal support members 13 rigidly associated with axles 14 at either end of which independently rotatable wheels 15 are journaled for travel along a pair of spaced conveyor tracks 16 which are supported by suitable structural members 17 to the floor 18.

While the pallets 12 merely rest without positive connection on the horizontal supports 13, they are each rigidly connected to a central cross member 19 which is in turn welded to a side bar 20 of the conveyor chain A. Adjacent side bars 21 of the conveyor chain are each rigidly associated with the axles 14. Rollers 22 journaled on the connecting pins 23 which join the side bars 20 and 21 extend laterally beyond such side bars and are adapted to travel between guide rails 24 which are mounted by members 25 to the cross beam 17, as best shown in Fig. 14.

In rounding a horizontal turn, the guide rails 24 establish a path for the individual rollers 22 which in pairs determine the respective paths of the outer side bars 20 and inner side bars 21. Since the side bars 20 are rigidly associated with the truck pallets 12, such pallets, together with their loads, will round the curve along the same radial line as the side bars 20, while the horizontal supporting members 13 and axles 14 which are rigidly associated with the inner side bars 21 will independently follow the radial path established by the side bars 21, sliding action taking place between the supporting members 13 and pallets 12 to accommodate required articulation between links 20 and 21.

Such action, together with the independent rotation of the truck wheels 15 permit the trucks and conveyor chain to pass around relatively sharp turns without any substantial frictional resistance and will be understood to establish a definite requirement for the axles of conveyor chain rollers 22 to be substantially vertical.

In loading a conveyor system of this type with automatic mechanism, it has been found necessary to stop the conveyor trucks directly in line with the loading mechanism, not shown, in order to permit the loads 10 to be lowered on to the cross beams 11 and the loading forks to be withdrawn. Inasmuch as the entire conveyor line with all the loads carried thereby must be stopped each time a new load is placed on an empty truck or taken off in unloading, the inertia of the conveyor line tends to cause drift beyond the point where the propelling dog stops.

The endless drive chain generally indicated as "B," which has been employed to overcome this drift, incorporates a chain proper consisting of inner and outer side bars 26a, 26b and rollers 27 rotatable on bearings 27a on the pivot shaft 34 connecting the side bars, and the chain is adapted to travel over a drive sprocket 280 and idler sprocket 290 in accordance with conventional practice. The characterizing features of the drive chain lie in the construction of propelling and retarding drive dogs 30a and 30b and the mechanism employed for controlling the position of such dogs. These propelling and retarding dogs are identical to each other in construction but are reversed on the drive chain B with respect to the position of the engaging faces 31a and 31b. As best shown in Figs. 3 and 4, each dog is provided with a pair of outwardly extending arms 28, a central bridge 29 joining the two arms, bores 300 in substantial longitudinal alignment with the arms 28, a pair of longitudinal extensions 310 adapted to straddle the drive chain B and a bore 32 in the end of each extension 310. The bores 300 and bearings 308 permit each drive dog to articulate on the extended shaft 34 which also forms an axle for side wheels 35. The bores 32, on the other hand, serve to mount stub axles 36 for wheels 37.

It will be seen from the description thus far that each dog 30 is adapted to articulate about extensions of shaft 34 which provides for an axis common to that of the chain pivot in substantial longitudinal alignment with the dog engaging face 31a, while the extension 310 and the wheels 37 straddling the drive chain are free to move in a path at variance with the path of the drive chain B and in so doing to vary the angle of the engaging arms 28 as well as the longitudinal position of their ends relative to the axis of articulation formed by the shaft 34.

As best shown in Figs. 3 and 4, each of the engaging arms 28 is provided with an arcuate corner face 39, four of which surfaces provided by two opposing dogs substantially coincide with the circular arc of the conveyor chain rollers 22 when the wheels of the two opposing dogs are in substantial alignment. As shown in Fig. 1, such four arcuate surfaces 39 are adapted to engage every other roller 22 in the conveyor chain A fully and positively enclosing such roller against movement in either direction relative to the drive chain B. In general, the path of the drive chain B is defined at either end by sprockets 28 and 29 and on the upper or drive side of the chain by guide rail 40 which extends between the sprockets and engages the rollers 27 of the drive chain B. The path of the dog wheels 35 will, of course, be identical with that of the drive chain B since such wheels and the rollers 27 are on common axes. On the other hand, the path of the free wheels 37 on the drive side of the chain is established by a pair of guide rails 41 and is at variance in side elevation with the contour of the chain guide rail 40.

The manner in which engagement and disengagement of the drive dogs with the rollers 22 takes place may best be understood by following through the progressive travel of the pair of dogs shown in the fragmentary views of Figs. 5 through 13. As a pair of drive dogs 30a and 30b travel around the idler sprocket, the path of the chain and dog wheels 35 will be established by the sprocket while the free wheels 37 are confined to substantially the same path by a guide member 42. In Fig. 5, the engaging faces 31a and 31b of the respective dogs will be noted to be in a wide open position. When these dogs have reached the position shown in Fig. 6, the leading free wheel 37 begins to follow the path established by the guide rail 41a which departs from the path of the drive chain established by the guide rail 40. In Fig. 7, the engaging faces 31a and 31b are seen to be in open or receiving position relative to conveyor chain roller 22 due to the angle of such faces established by the guide rail 41a. In Fig. 8 both of the free wheels 37 are on the horizontal run 41a of the guide rail 41 and the dog faces are still in an open position.

In Fig. 9, the leading free wheel 37 has reached the upward curve 41b which leads such wheel eventually to an aligned position with wheels 35, and has accordingly started the movement of the engaging face 31b toward an engaging relation with the roller 22. In Fig. 10, the leading wheel 37 has reached the aligned position and the engagement of face 31b with the roller 22 has taken place. When the position of Fig. 11 has been reached, the trailing roller 37 enters the arcuate section 41b and the travel up such section, partially completed in Fig. 12, brings the engaging face 31a into the engaging position shown in Fig. 13. When the latter position is reached, all wheels 35 and 37 are in horizontal alignment and both engaging faces 31a and 31b have engaged the roller 22 gripping the same against movement in either direction relative to the drive chain B. It will be noted that in reaching such engaging position, the engaging faces 31a and 31b make a normal contact with the rollers 22 so that no scuffing action, which might be productive of wear and looseness, can take place during engagement.

The guide tracks 40 and 41 are symmetrical on either end and it will be understood that disengagement of the rollers at the end of the drive will take place in exactly the reverse manner as that just described for engagement of the drive. It will also be noted that this arrangement permits the drive to be transmitted in either direction as might be desired in reversing the travel of the conveyor as well as in stopping its movement for loading purposes.

Figure 2:
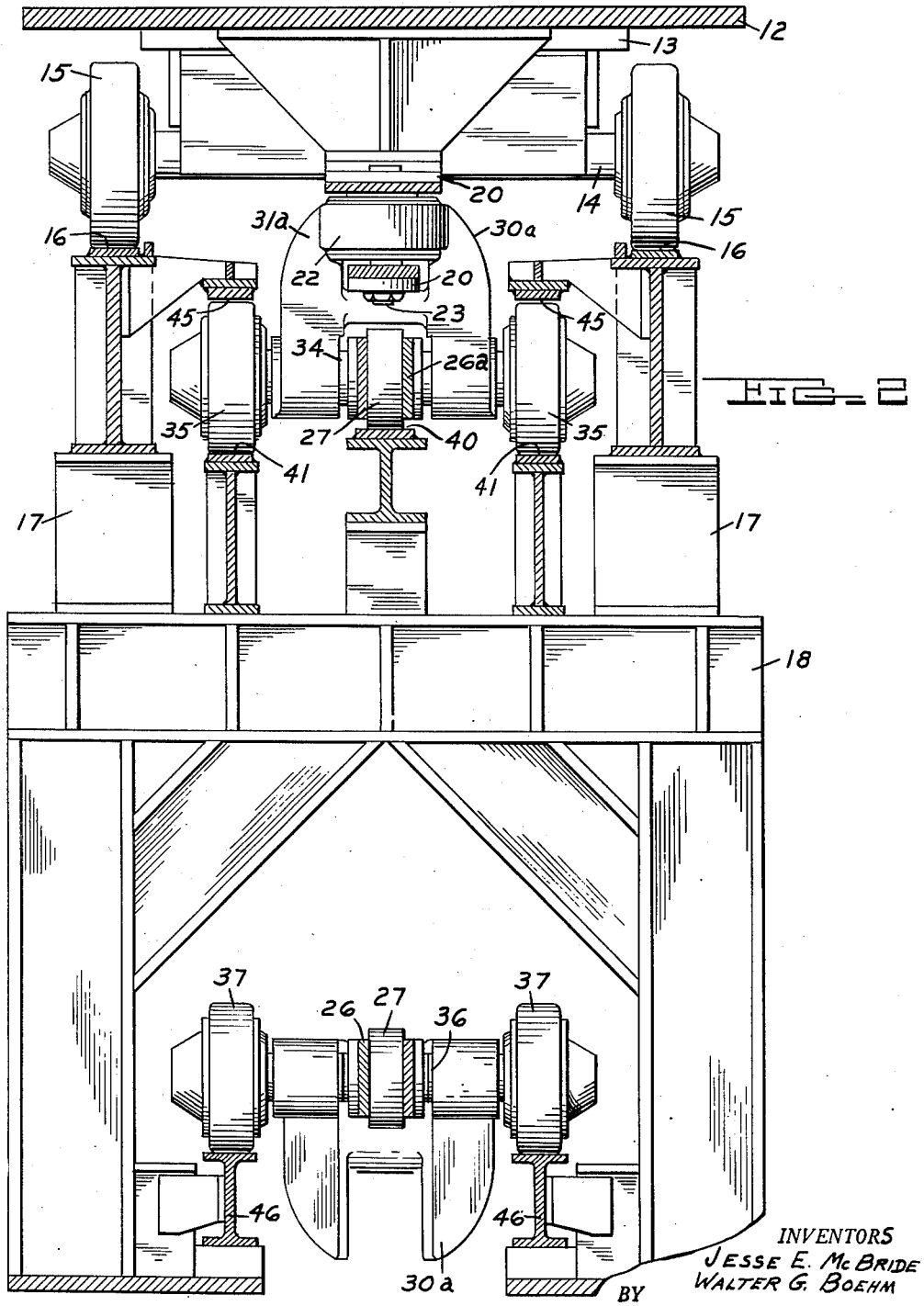
Fig. 2 is a sectional end elevation taken along the line 2—2 of Fig. 1.

Referring to Fig. 2, it will be seen that upper guide rails 45 are provided as reaction members for the dog wheels 35 over the drive engaging portion of the drive chain's travel so that any tendency of reaction pressure from the conveyor chain rollers 22 to tilt the face of either propelling or retarding dogs will be fully resisted and the opposed faces 31a and 31b of the dogs will accordingly be positively held in parallel gripping relationship during their travel across the horizontal drive engaging reach 41c of the guide rail 41.

As shown in Fig. 1, the horizontal reach 41c of the guide rail 41 is proportioned relative to the pitch of the drive chain B so that at least one propelling and one retarding dog will be in full engagement at all times and so that no more than two adjacent propelling or retarding dogs will ever be in simultaneous engagement with rollers 22.

A pair of return rails 46 are provided to be contacted by both wheels 35 and 37 on the return side of the chain in passing between sprocket members.

From the above description, it will be seen that a drive chain has been provided which will accurately synchronize movement of the conveyor chain A with that of the drive chain B whether the drive be used in propelling, retarding or reversing direction and wherein lost motion between conveyor and drive chains from a reversal of driving effort is completely eliminated. It will also be seen that this result is effected by drive engagement which is normal to the direction of travel and accordingly involves no relative sliding between driving and driven members.

While a particular embodiment has been described above in detail, it will be recognized that a number of modifications could be made without departing from the scope of our invention as defined in the following claims.

We claim:

1. A conveyor system comprising load carriers, a conveyor chain for propelling said carriers, members on said chain at regular fixed intervals, an endless drive chain for said conveyor chain, outwardly extending dogs pivotally connected to said drive chain adapted to simultaneously engage opposed surfaces of said members for imparting driving or retarding force thereto with substantially no lost motion upon reversal of force, rollers on said dogs laterally spaced from said drive chain and longitudinally spaced from the pivotal connections of said dogs, other rollers on the pivotal axes of said dogs laterally spaced from said drive chain, cam means for engagement by said first-named rollers adapted to impart articulation to said dogs in a manner causing them to engage said members and absorb drive reaction during drive engagement, and a track for engagement by said second-named rollers to absorb drive reaction during the drive engagement of said dogs.

2. A conveyor system comprising load carriers, a conveyor chain for propelling said carriers, members on said chain at regular fixed intervals, an endless drive chain for said conveyor chain, symmetrical pairs of opposed outwardly extending dogs pivotally connected to said drive chain, rollers laterally spaced from said drive chain on the pivotal axis of each dog, additional laterally spaced rollers on each dog spaced longitudinally from said first-named rollers, a pair of laterally spaced cam tracks for engagement by said second-named rollers adapted to impart articulation to said dogs in a manner causing them to engage opposed surfaces of said members for imparting driving or retarding force thereto in either longitudinal direction with substantially no lost motion upon reversal of force, and a pair of laterally spaced tracks for engagement by said first-named rollers adapted to abosrb reaction forces imparted thereto during the drive engagement of said dogs.

3. A conveyor system comprising load carriers, a conveyor chain for propelling said carriers, members on said chain at regular fixed intervals, an endless drive chain for propelling and retarding said conveyor chain, pairs of outwardly extending dogs pivotally connected to said drive chain adapted to simultaneously engage opposed surfaces of said members for imparting driving or retarding force thereto with substantially no lost motion upon reversal of force, opposite actuating extensions on said dogs, and cam means engaged thereby for imparting opposite articulation to said dogs in a manner causing them to engage said members, said cam means including a portion located a sufficient distance beyond the beginning drive level of the drive chain links to actuate each of said driving and retarding dogs to an engaging position only after associated drive chain links have reached a driving level.

4. A conveyor system comprising load carriers, a conveyor chain for propelling said carriers, rollers on pivotal axes of said conveyor chain, an endless drive chain for propelling and retarding said conveyor chain, pairs of independently articulating dogs pivotally connected to said drive chain adapted to simultaneously engage opposed surfaces of said rollers for imparting driving or retarding force thereto with substantially no lost motion upon reversal of force, opposite actuating extensions on said dogs, and cam means engaged thereby for imparting opposite articulation to said dogs in a manner causing them to engage said rollers, said cam means including a portion located a sufficient distance beyond the beginning drive level of the drive chain links to actuate each of said driving and retarding dogs to an engaging position only after associated drive chain links have reached a driving level.

5. A conveyor system comprising load carriers, a conveyor chain for propelling said carriers, members on said chain at regular fixed intervals, an endless drive chain for propelling and retarding said conveyor chain, said drive chain traveling in a plane substantially perpendicular to the plane of said conveyor chain, pairs of independently articulating outwardly extending dogs pivotally connected to said drive chain adapted to simultaneously engage opposed surfaces of said members for imparting driving or retarding force thereto with substantially no lost motion upon reversal of force, opposite actuating extensions on said dogs, and cam means engaged thereby for imparting opposite articulation to said dogs in a manner causing them to engage said members, said cam means including a portion located a sufficient distance beyond the beginning drive level of the drive chain links to actuate each of said driving and retarding dogs to an engaging position only after associated drive chain links have reached a driving level.

6. A conveyor system comprising load carriers, a conveyor chain for propelling said carriers, members on said chain at regular fixed intervals, an endless drive chain for propelling and retarding said conveyor chain, pairs of outwardly extending dogs pivotally connected to said drive chain adapted to simultaneously engage opposed surfaces of said members for imparting driving or retarding force thereto with substantially no lost motion upon reversal of force, opposite actuating extensions on said dogs, and cam means engaged thereby for imparting opposite articulation to said dogs in a manner causing them to engage said members, said cam means having a straight portion for engagement by said extensions during that portion of travel corresponding to full engagement of said members, and a portion inclined thereto for actuating said dogs toward an engaging position, the beginning of said straight portion being located in a sufficiently advanced position to be contacted by the extensions of either driving or retarding dogs only after associated drive chain links have reached a driving level.

7. A conveyor system comprising load carriers, a conveyor chain for propelling said carriers, members on said chain at regular fixed intervals, an endless drive chain for said conveyor chain, pairs of outwardly extending dogs pivotally connected to said drive chain adapted to simultaneously engage opposed surfaces of said members for imparting driving or retarding force thereto in either longitudinal direction with substantially no lost motion upon reversal of force, opposite actuating extensions on said dogs, cam means engaged thereby for imparting opposite articulation to said dogs in a manner causing them to engage said members, said cam means including a level portion for engagement by said extensions during the portion of travel corresponding to full engagement of said members, and said cam means having symmetrical curves at the ends of said straight portion adapted to rapidly actuate said dogs respectively toward and away from drive engaging position, the drive level of the links of said drive chain being maintained beyond the level portion of said cam means a distance sufficient to insure both the establishment and release of contact by both driving and retarding dogs with said members while associated links are at a drive level.

8. A conveyor system comprising load carriers required to be intermittently started and accurately stopped, as at predetermined loading or unloading positions, the inertia of said load carriers requiring a retarding force to be applied in stopping them, a conveyor chain for propelling said carriers, members on said chain at regular fixed intervals, an endless drive chain for propelling and retarding said conveyor chain, outwardly extending dogs pivotally connected to said drive chain adapted to simultaneously engage opposed surfaces of said members for imparting driving or retarding force thereto with substantially no lost motion upon reversal of force, opposite actuating extensions on said dogs, and cam means engaged thereby for imparting articulation to said dogs in a manner causing them to engage said members, said cam means including a portion located a sufficient distance beyond the beginning drive level of the drive chain links to actuate each of said driving and retarding dogs to an engaging position only after associated drive chain links have reached a driving level.

9. A conveyor system comprising load carriers required to be intermittently started and accurately stopped, as at predetermined loading or unloading positions, the inertia of said load carriers requiring a positive control for limiting the drift of said load carriers in accurately bringing them to said predetermined stopping positions, a conveyor chain for propelling said carriers, members on said chain at regular fixed intervals, an endless drive chain for propelling and retarding said conveyor chain, outwardly extending dogs pivotally connected to said drive chain adapted to positively grip opposed surfaces of said members against relative movement in either direction, opposite actuating extensions on said dogs, and cam means engaged thereby for imparting articulation to said dogs in a manner causing them to so grip said members, said cam means including a portion located a sufficient distance beyond the beginning drive level of the drive chain links to actuate each of said driving and retarding dogs to an engaging position only after associated drive chain links have reached a driving level.

10. An endless chain drive for a continuous conveyor adapted to facilitate accurate stopping as well as propulsion, said conveyor having engageable members at regular intervals, said endless chain having pairs of outwardly extending dogs pivotally connected thereto and positioned to simultaneously engage forward and aft portions of said members, oppositely directed integral extensions on each pair of said dogs for imparting pivotal articulation thereto as well as for transmitting drive and retarding reaction, cam means engaged by said extensions for controlling said articulation and absorbing said reactions, said cam means including a portion for causing opposite articulation in each of a pair of dogs approaching said conveyor toward its respective engaging position, another portion for causing opposite articulation in a reverse direction in each of a pair of dogs leaving said conveyor, and an intermediate portion for holding said dogs in their respective engaged driving and retarding positions, means determining the extent of the driving level of the endless chain links, said first two portions of said cam means being located within the driving level of the endless chain links by a distance sufficient to assure engagement and disengagement of both propelling and retarding dogs only while associated chain links are at such driving level, and a pair of longitudinally spaced sprockets for said endless chain having fixed longitudinal positions, whereby said endless chain drive may be employed in accurately stopping as well as propelling said conveyor without lost motion between driving and retarding engagement and without uncontrolled drift of said conveyor.

JESSE E. McBRIDE.
WALTER G. BOEHM.

REFERENCES CITED

The following references are of record in the file of this patent:

UNITED STATES PATENTS

| Number | Name | Date |
|---|---|---|
| 431,262 | Henderson | July 1, 1890 |
| 716,932 | Peck | Dec. 30, 1902 |
| 1,279,579 | Perkins | Sept. 24, 1918 |
| 1,960,719 | Stibbs | May 29, 1934 |
| 2,101,353 | Waalkes | Dec. 7, 1937 |
| 2,309,587 | Hassler | Jan. 26, 1943 |
| 2,361,222 | McBride | Oct. 24, 1944 |
| 2,476,497 | Landahl | July 19, 1949 |

FOREIGN PATENTS

| Number | Country | Date |
|---|---|---|
| 292,695 | Great Britain | June 26, 1928 |
| 617,373 | Germany | Aug. 17, 1935 |
| 630,499 | Germany | May 29, 1936 |